United States Patent [19]

Godesa

[11] Patent Number: 4,729,248

[45] Date of Patent: Mar. 8, 1988

[54] LEVER ARRANGEMENT FOR TRANSMITTING LIMITED TILTING MOTIONS

[75] Inventor: Ludvik Godesa, Berlin, Fed. Rep. of Germany

[73] Assignee: Siemens Aktiengesellschaft, München, Fed. Rep. of Germany

[21] Appl. No.: 937,898

[22] Filed: Dec. 4, 1986

[30] Foreign Application Priority Data

Dec. 13, 1985 [DE] Fed. Rep. of Germany ....... 3544666

[51] Int. Cl.$^4$ .......................... G05G 17/00; F16N 1/00
[52] U.S. Cl. ............................................. 74/2; 74/520; 184/109; 200/153 SC; 384/286; 384/291; 403/158; 403/162
[58] Field of Search ............................. 74/2, 106, 520; 184/109; 474/91; 384/286, 287, 291, 322, 372; 403/158, 162; 200/153 R, 153 SC

[56] References Cited

U.S. PATENT DOCUMENTS

| | | | |
|---|---|---|---|
| 629,515 | 7/1899 | MacDonald | 474/91 |
| 2,285,145 | 6/1942 | Burt | 474/91 X |
| 2,400,230 | 5/1946 | Fulke | 474/91 |
| 3,301,984 | 1/1967 | Wilson | 200/153 R |
| 3,336,089 | 8/1967 | Krickler | 474/91 X |
| 3,478,787 | 11/1969 | Piller | 474/91 X |
| 3,849,619 | 11/1974 | Patel | 200/153 SC |
| 4,094,208 | 6/1978 | Tsutsumi | 74/520 |

*Primary Examiner*—Allan D. Herrmann
*Attorney, Agent, or Firm*—Kenyon & Kenyon

[57] ABSTRACT

A lever arrangement comprises a bearing pin and a supply space arranged next to the bearing opening of at least one of the levers and which contains a high-viscosity lubricant. In the operation of the lever arrangement with alternating tilting direction, the lubricant arrives, due to its inertia, in the respectively unstressed part of the bearing gap between the levers. The arrangement is suited particularly for highly stressed parts in the mechanism of circuit breakers which must be designed for space saving due to the small space available. The service life of such lever arrangements is increased substantially by arranging the lubricant in the supply space. The supply space can be part of a sleeve braced on the bearing pin.

7 Claims, 9 Drawing Figures

LEVER ARRANGEMENT FOR TRANSMITTING LIMITED TILTING MOTIONS

BACKGROUND OF THE INVENTION

The present invention relates to an articulated lever arrangement for transmitting limited tilting motions with alternating direction with at least one pivot and one lever provided with a bearing opening for the pivot.

Lever arrangements of this type are a component of many technical devices and are used, for instance, in low-voltage circuit breakers for transmitting forces to the contact members. As long as the forces are small, parts with the simplest design are sufficient to meet the intended purpose. If, however, the forces are larger and if the motions are executed with very high acceleration, considerable mechanical problems can be expected. It therefore presents difficulties, even if the parts are designed strong and carefully, to keep the wear so small that a specified number of operation cycles is possible. This problem applies, for instance, in low-voltage circuit breakers, e.g., according to U.S. Pat. Nos. 3,301,984 or 3,849,619 to the joint between a thrust lever transmitting the force of a spring accumulator, a driver lever mounted on a control shaft and to a coupling organ transmitting the motion to a contact arrangement, since at this point, not only the actuating energy leading to a contact member is passed-on in the case of multi-pole circuit breakers, but also the actuating energy for further contact members connected to the control shaft.

In mechanical engineering, various designs and components are known per se which are suitable for the low-wear and low-friction transmission of large forces under unfavorable conditions. Lever arrangements of such design, however, require a larger amount of space which cannot be made available in view of the extremely compact design of modern circuit breakers. Also lubricating the lever arrangements turned out to be a problem because the lubricants cannot be brought to bear in the desired manner due to design conditions. If oil-like lubricants are chosen, for example, they wet the bearing surfaces due to their creep behavior, and protect the bearings insufficiently because of the limited toughness and load-carrying capacity of the lubricant. In addition, there is the danger, because of the jerky motions with high acceleration as they occur in circuit breakers, that oil-like lubricants are flung from the parts to be lubricated and cause undesired soiling in the interior of the circuit breaker. If, on the other hand, lubricants with a greasy or fatty constitution are chosen, i.e., with greater viscosity, they are effective only for a few operating cycles because the lubricant is then displaced and used up and cannot flow back due to its great viscosity.

SUMMARY OF THE INVENTION

Starting therefrom, it is an object of the present invention to develop a lever arrangement of the type mentioned, having a design as simple as possible of its cooperating parts such that the wear is reduced substantially and the number of possible operating cycles is increased accordingly.

The above and other objects of the present invention are achieved by an articulated lever arrangement for transmitting limited tilting motions with alternating direction, having at least one pivot pin and a lever provided with a bearing opening for the pivot pin, a supply space being provided laterally next to the bearing opening for receiving a high-viscosity lubricant which is in connection with the bearing gap between the lever and the pivot pin.

The lateral position of the supply space can be chosen radially as well as axially with respect to the pivot of the arrangement. By placing the lubricant in a limited space, it is thereby achieved that the lubricant cannot escape freely due to the jerky accelerations and decelerations in each operating cycle, but rather gets into the bearing gap on that side which was unstressed during the preceding motion. In this manner, the lubricant is now available where it is required in the subsequent operating cycle with the reversed direction of motion. It has been found that lubricants with so high a viscosity can be used which would not be suitable for the normal, open application for lubricating lever arrangements.

Due to the new arrangement, however, the high-viscosity lubricant becomes fully effective and increases the service life of lever arrangements of the type considered above substantially.

One practical embodiment for forming the supply space is to provide a sleeve which surrounds the pivot pin and adjoins the lever. Such a sleeve can also be supported in a simple manner at the pivot in that the hole of the sleeve is given a part fitting the diameter of the pivot pin as well as a part made larger in comparison for receiving the lubricant. In this connection it is advantageous to design the sleeve as a spacer between levers arranged in pairs. Here, the sleeve fulfills a double function since it braces on the one hand the levers arranged in pairs against each other and prevents jamming and changes in spacing, and in addition, takes up the supply of lubricant.

As already mentioned, the difficulties described occur, for instance, in low-voltage circuit breakers. In such devices, the life of the most highly stressed parts can be improved by the provision that the pivot pin is the connecting element for transmitting the force between two drive levers arranged on a control shaft, two support levers acted upon by a spring accumulator, of a thrust lever and a coupling member connected to a contact arrangement of the circuit breaker, and that the sleeve is designed in accordance with the distance between the partial levers and the latter are arranged adjacent to the driving levers. At this point, the full driving energy for all contact members of the switch is transmitted. Therefore, the flow of energy is extremely high at this point in a three or four hole switch. In view of the small space available, it is not possible on the other hand, as explained above, to employ costly joint designs of great strength and durability. Rather, only joint arrangements of a simple design can be used which have smooth cylindrical pins and straps consisting of sheet steel with bearing openings made by stamping or drilling. This bearing point is given substantially longer life by the invention.

As mentioned above, the supply space for the lubricant can be arranged radially as well as axially next to the bearing gap. A radially lateral arrangement can be realized to particular advantage by a hole leading into the bearing opening. With a lever having two bearing openings, such a hole can be arranged so that it connects the two bearing openings. Thereby, lubricant is fed to both bearing openings if the lever moves alternatingly in the direction of the connecting line of the bearing openings. A lever of this type is likewise suitable for electric circuit breakers, especially in the area of the driving parts.

As already mentioned, the new lever arrangement is particularly well suited for use in low-voltage circuit breakers in such a manner that the bushing is arranged between the lever sections of a thrust lever. In order to achieve the greatest effectiveness, it is desirable that the bushing rests against the lever sections as free of play as possible. According to one embodiment of the invention, this can be achieved by the feature that the bushing consists of two sections, each of which have a supply space adjoining the lever sections and the total length of both sections is made smaller than the spacing of the lever sections by the interposition of washers for dimensionally correct matching to the spacing of the lever sections. Identical sections can be used here for forming the bushing.

The installation of the bushing in the lever arrangement can further be facilitated over the embodiment just described by the feature that the bushing is composed of two parts which are axially movable in an interlaced manner relative to each other, and that at least one axially active spring element is arranged between two oppositely arranged ring areas of the parts. In the assembly, such a bushing acts like an ordinary one-piece bushing but adapts itself without play to the spacing of the lever sections due to the springiness of the spring element.

The substantially same property of adaptation of the lever parts without play can also be achieved by a further embodiment of the bushing which has an inner part with a lathe cut provided approximately centered at the circumference, and a part of the jacket extending beyond the one end face of the bushing which has a region which can radially be deformed permanently. Such a region can be formed, for instance, by recesses which are arranged distributed over the circumference and by which the cross section of the jacket piece is reduced.

Approximately the same properties as the mentioned embodiment of the bushing equipped with a spring element can be accomplished by the provision that the bushing, if made of one piece of plastic, has an axially elastically deformable region arranged approximately in the center. This can be achieved, in a manner known per se, also by a region with reduced cross section approximately so that two or more arms extending in the circumferential direction are formed as a connection of the end pieces of the bushing. Thermoplastic materials are particularly well suited for making such bushings.

BRIEF DESCRIPTION OF THE DRAWINGS

The invention will now be explained in greater detail in the following detailed description with reference to the drawing figures, in which.

DETAILED DESCRIPTION

Figure 1:
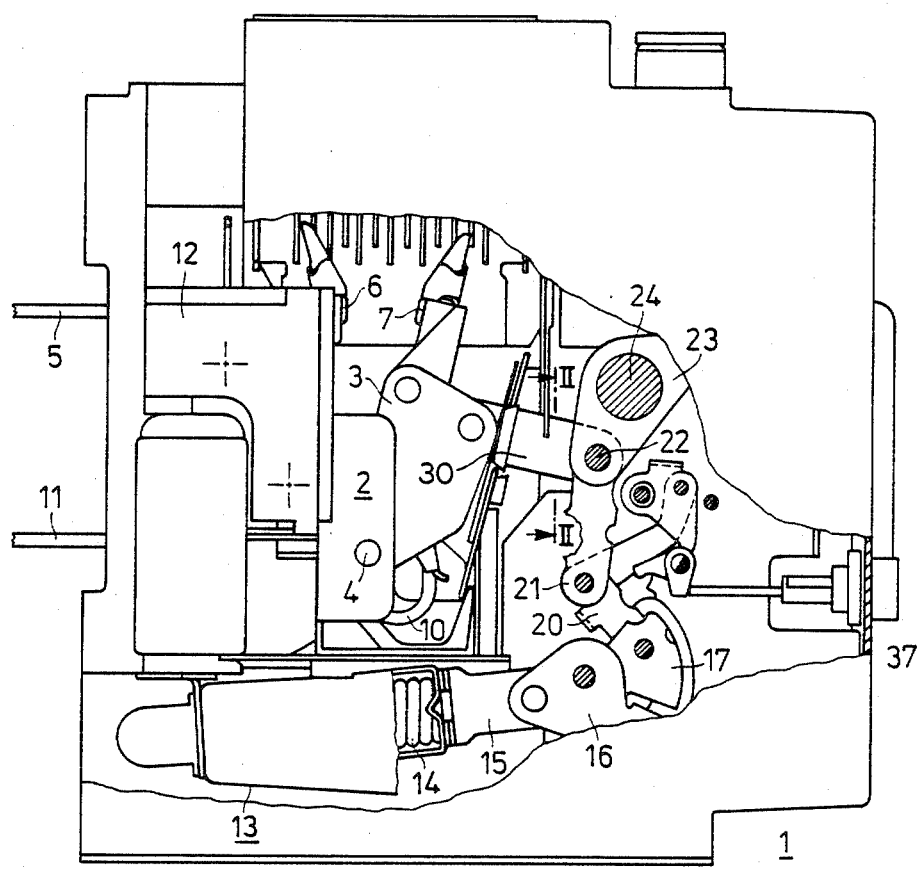
FIG. 1 shows a low-voltage circuit breaker in a simplified cross-sectional presentation.

The low-voltage circuit breaker 1 shown in FIG. 1 contains a contact arrangement 2, the movable part 3 of which can be tilted about a stationary bearing 4. The contact arrangement 2 is shown in the opened condition; if it is closed, a closed current path is formed which extends from an upper connecting conductor 5 via a fixed contact 6, a contact 7 located at the movable part 3 of the contact arrangement as well as a current carrying ribbon 10 to a lower connecting conductor 11. Below the contact arrangement 2 fastened to an insulating carrier 12, there is a spring accumulator 13 which makes available the switching energy for closing the circuit breaker 1. Considering that circuit breakers of this type are designed as a rule with several poles, i.e., with three or four poles and that, when switching on a short circuit, strong repulsion forces must be overcome, the circuit breaker requires much energy.

Figure 2:
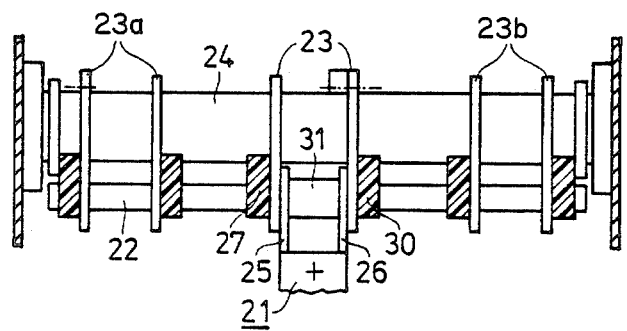
FIG. 2 shows as a detail a control shaft of the circuit breaker according to FIG. 1 with adjoining parts of an articulated lever arrangement taken along line II—II of FIG. 1.

In FIG. 1, the spring accumulator is shown in the cocked condition. Compression springs 14 contained in the spring accumulator act on a drive 16 via a thrust rod 15 which cooperates with a lower toggle lever 17 of a multi-member lever arrangement. Part of this is a central toggle lever 20 as well as a lower toggle lever 21 which acts as a thrust lever and is connected by means of a pivot pin 22 to a driving lever 23 which is fastened on a control shaft 24. As is shown in FIG. 2, three pairs of driving levers 23, 23a and 23b are fastened which are provided for actuating three contact arrangements 2 arranged next to each other. The pivot pin 22 thus transmits the entire mechanical energy required for switching. As is further shown in FIG. 2, the upper toggle lever 21 is formed by partial levers 25 and 26 which rest against the sides facing each other of the two centrally arranged driving levers 23. Against the sides of the driving levers 23 facing away from each other rest coupling members 27 and 30 which serve for passing-on the driving energy to the moveable part 3 of the central contact arrangement 2 shown in FIG. 1. The detailed design of the lever arrangement in the vicinity of the pivot pin 22 is shown in FIG. 3.

Figure 3:
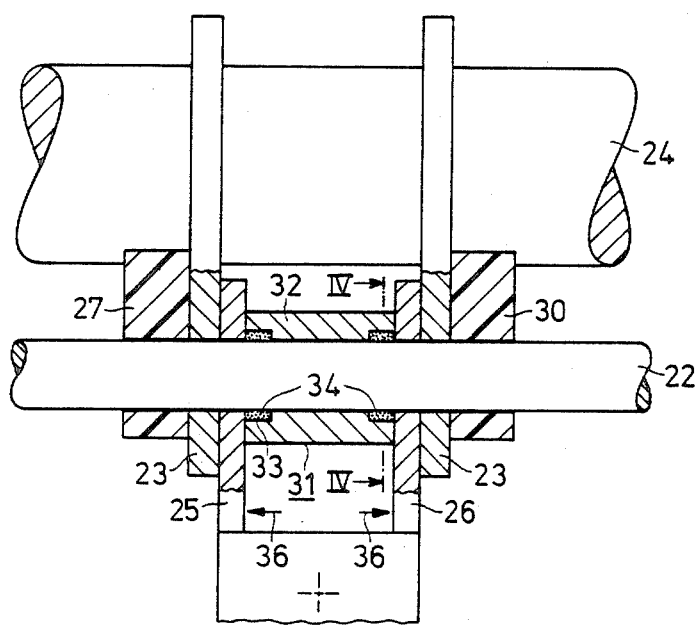
FIG. 3 shows a joint arrangement in a larger scale, in cross section.

As shown in FIG. 3, there is provided between the lever parts 25 and 26 of the upper toggle lever 21 a sleeve 31, the length of which is matched to the spacing of the lever parts 25 and 26 and therefore braces these levers against each other and prevents them from jamming under the influence of the strong forces. The levers 25 and 26 in turn rest against the driving levers 23 of the control shaft 24. The central part 32 of the sleeve 31 is adapted to the diameter of the bearing pin 22. Near the ends, the inside diameter of the bearing sleeve 31 is widened by lathe cuts 33 to form an annular space serving as the supply space, in which a lubricant 34 with the highest possible viscosity is located.

Figure 4:
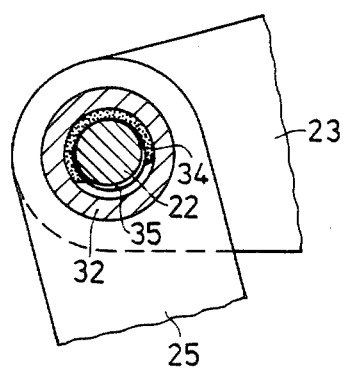
FIG. 4 shows a detail of a lever joint for explaining the motion of a lubricant taken along line IV—IV of FIG. 3.

Upon the release of the spring accumulator 13 by a closing latch, not shown, the toggle switch arrangement explained in connection with FIG. 1 is stretched, whereby the control shaft 24 with the driving levers 23 mounted thereon is tilted in a jerky motion via the pivot pin 22. The tilt angle is relatively small and may be in the range of 50° to 60°. The lever parts 25 and 26 rest with their bearing openings, of which one (35) is shown in FIG. 4, against the one side of the bearing pin 22. If the arrangement now arrives in its end position, the lubricant 34 is subjected due to its inertia, to an acceleration which is sufficient to overcome the viscosity of the lubricant and to transport it into the part of the bearing gap which had remained unstressed during the preceding motion. This is indicated by arrows 36 in FIG. 3. Vibration or impact caused by the sudden breaking of the parts also can contribute to the distribution of the lubricant into the bearing gap.

In opening, the tilting motion described is executed in the reverse direction. To this end, the opening latch is released by means of a push button 37 (FIG. 1) whereby the support is removed from the stretched toggle lever arrangement in a manner known per se. The control shaft 24 with a driving lever 23 mounted thereon now swings back counterclockwise into the position shown in FIG. 1. The energy for carrying out this motion is now supplied by springs which are part of the contact arrangement 2 in a manner known per se and had been cocked during the preceding closing of the circuit breaker 1. In the course of this opening motion, the opposite side of the bearing pin 22 is now stressed, on which, however lubricant had been deposited from the annular spaces 33 of the sleeve 31 in the manner explained. Thereby, the wear is kept low in the desired manner.

As shown in observing the arrangement according to FIGS. 3 and 4, the highly stressed surfaces are periodically supplied with new lubricant, since at the end of each motion cycle, an acceleration sufficient for transporting the lubricant occurs. Therefore, lubricants with high viscosity can be used which in normal application would not provide sufficient wetting of bearing surfaces due to their low flowability. Exactly such lubricants are well suited, however, to protect bearing surfaces which are subjected to a high stress with small relative motion.

Figure 5:
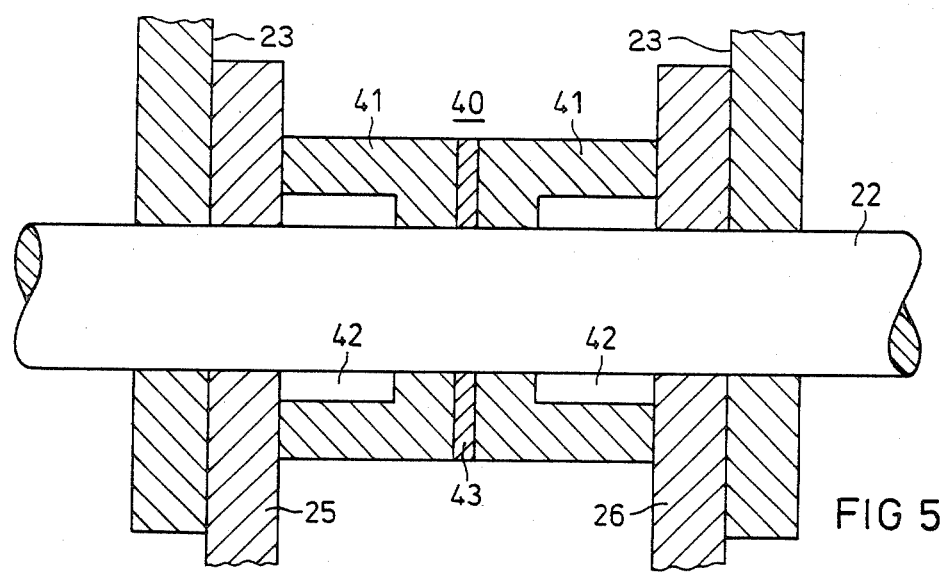
FIG. 5 is a view corresponding to FIG. 3 with a bushing divided into two parts.

In the following, embodiments of bushings will be described which permit obtaining contact of the end faces of the bushing as free of play as possible, independently of tolerances of the spacing of the lever sections 25 and 26 and the bushing and thereby to give the arrangement the greatest effectiveness. In this connection, FIG. 5 shows, in a view approximately corresponding to FIG. 3, the lever sections 25 and 26 as well as the pivot pin 22 and a bushing 40 arranged between the lever sections. This bushing is composed of two identical parts 41, each of which has a supply space 42 for the lubricant. The overall length of both pieces 41 is made intentionally smaller than the spacing of the lever sections 25 and 26 so that close contact of the end faces of the pieces 41 with the lever sections 25 and 26 is achieved by inserting conventional washer 43 in accordance with the prevailing tolerance.

Figure 6:
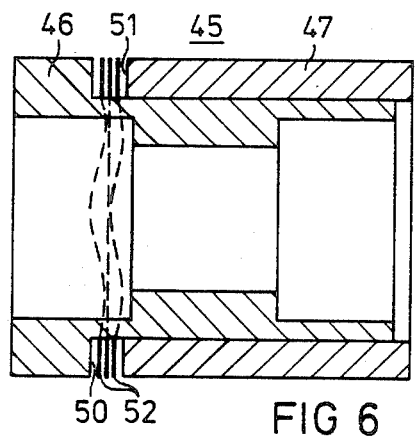
FIG. 6 shows a two part bushing provided with springs shown as an individual part in a cross section.

In FIG. 6, only a bushing 45 is shown without the adjacent parts. The bushing 45 is composed of two parts 46 and 47 which are axially movable interlaced and relative to each other. The part 46 contains here the two supply spaces for the lubricant, while the part 47 forms a cylindrical jacket which is movable on the part 46. Between the oppositely arranged annular surfaces 50 and 51 of the parts 46 and 47, several axially effective spring elements 52 are inserted, for instance, cup springs or corrugated spring washers. In the assembly into the lever arrangement according to FIGS. 2 or 3, the end faces of the parts 46 and 47 rest against the lever sections 25 and 26 with a certain amount of pretension due to this springiness.

Figure 7:
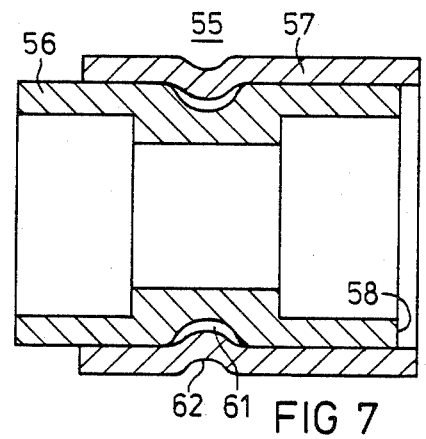
FIG. 7 shows, likewise as an individual part, a bushing which can be adapted to the spacing of lever sections by permanent deformation.

An exact adaptation of the bushing to the spacing of the lever section can be achieved, however, also without subdivision into parts or additional washers or spring elements, by a one-piece design according to FIG. 7. This embodiment has a inner part 56 which corresponds substantially, for instance, to the bushing 31 in FIG. 3, but is made shorter than the latter. The inner part 56 is provided with a jacket part 57 which extends beyond the one end face 58 of the inner part 56. The inner part 56 is provided approximately in the center with a lathe cut 61. The latter is engaged by a deformable region 62 of the jacket part 57 which, if desired, can also be formed by spots of reduced cross section or by recesses. In this manner a permanent deformation can be achieved by the action of the radially directed force onto the region 62 of the jacket part 57, whereby the material of the jacket part 57 is pushed into the lathe cut 61. The inner part 56 and the jacket part 57 are thereby joined together in the desired position and make a bushing of suitable length.

Figure 8:
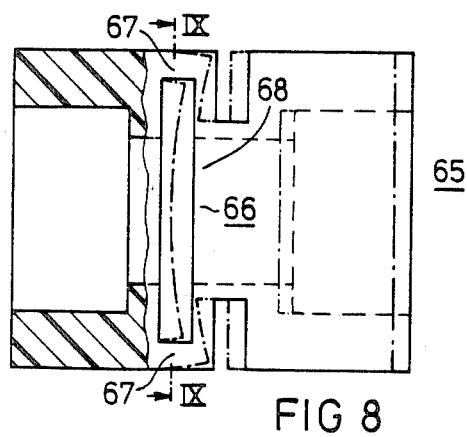
FIG. 8 shows an elastic bushing made as a one-piece plastic part. The cross section IX—IX in FIG. 8 is shown in FIG. 9.
Figure 9:
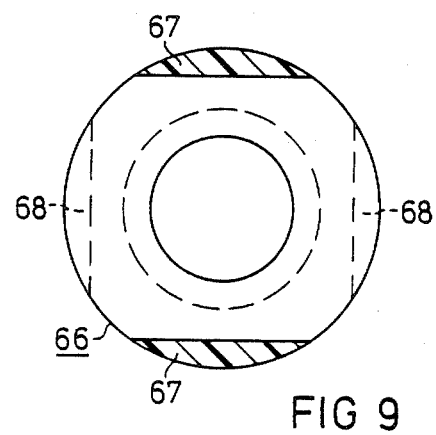
FIG. 9 shows the cross section IX—IX in FIG. 8.

Spring contact of the bushing against the lever sections can also be achieved in accordance with the embodiment in FIGS. 8 and 9. In contrast to the bushings described above, the bushing 65 shown here is made in one piece of a suitable plastic, especially thermoplastic material and has a central elastically deformable region. The latter is realized, as is shown by the cross section IX—IX in FIG. 9, as a resilient connecting disc 66 which is connected to the adjoining partial bodies of the bushing 65 by two arms 67 and 68 arranged on opposite sides.

A deformation occurring when the bushing 65 is installed in a lever arrangement according to FIG. 2 is shown schematically in FIG. 8 by dashed-dotted lines.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An articulated lever arrangement for transmitting limited tilting motions with alternating direction, comprising at least one pivot pin and a lever provided with a bearing opening for the pivot pin, a supply space being provided laterally next to the bearing opening for receiving a high-viscosity lubricant which is in connection with a bearing gap between the lever and the pivot pin, the supply space comprising a sleeve which surrounds the pivot pin and is adjacent to the lever, the sleeve having a bore hole, a part of the bore hole being adapted to the diameter of the pivot pin and a part being enlarged relative thereto, for receiving the lubricant.

2. The lever arrangement recited in claim 1, wherein two levers are arranged on the pivot pin and the sleeve comprises a spacer extending between the levers.

3. The lever arrangement recited in claim 1, wherein the pivot pin comprises a connecting element for transmitting force between two driving levers mounted on a control shaft, two lever parts of a push lever acted upon by a spring accumulator and two coupling members connected to a contact arrangement of a low-voltage circuit breaker, said sleeve being designed according to the spacing of the lever parts, said lever parts being arranged resting against the driving levers.

4. The lever arrangement recited in claim 3, wherein the sleeve comprises two parts, each of which has a supply space adjoining the lever parts the overall length of both sleeve parts being smaller than the spacing of the lever parts for dimensionally correct adaptation to the spacing of the lever parts by the interposition of washer means.

5. The lever arrangement recited in claim 3, wherein the sleeve comprises two individual parts which are axially movable in an interlaced manner relative to each other, and at least one axially acting spring element being arranged between two oppositely arranged annular surfaces of the individual parts.

6. The lever arrangement recited in claim 3, wherein the sleeve has an inner part having a recess provided therein approximately centered at the circumference and a jacket part which extends beyond one end face of the inner part and has a radial, permanently deformable region.

7. The lever arrangement recited in claim 3, wherein the sleeve comprises one piece of plastic material and has a region which is arranged approximately centered and is elastically deformable in the axial direction.

* * * * *